United States Patent
Akhtar et al.

(10) Patent No.: US 11,669,714 B1
(45) Date of Patent: *Jun. 6, 2023

(54) MODELS FOR STOP SIGN DATABASE CREATION

(71) Applicant: Samsara Inc., San Francisco, CA (US)

(72) Inventors: Muhammad Ali Akhtar, Oakland, CA (US); Abhishyant Khare, San Francisco, CA (US); Brian Tuan, Cupertino, CA (US); John Charles Bicket, Burlingame, CA (US)

(73) Assignee: SAMSARA INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,295

(22) Filed: Aug. 24, 2021

Related U.S. Application Data

(63) Continuation of application No. 17/197,557, filed on Mar. 10, 2021, now Pat. No. 11,126,910.

(51) Int. Cl.
*G06N 3/02* (2006.01)
*G06F 16/29* (2019.01)
*G06N 7/01* (2023.01)

(52) U.S. Cl.
CPC .............. *G06N 3/02* (2013.01); *G06F 16/29* (2019.01); *G06N 7/01* (2023.01)

(58) Field of Classification Search
CPC .......... G06F 16/29; G06N 7/005; G06N 3/02; G06N 7/01
See application file for complete search history.

(56) References Cited

U.S. PATENT DOCUMENTS

| | | | |
|---|---|---|---|
| 5,917,433 A | 6/1999 | Keillor et al. | |
| 6,192,312 B1 | 2/2001 | Hummelsheim | |
| 6,452,487 B1 | 9/2002 | Krupinski | |
| 8,633,672 B2 | 1/2014 | Jung et al. | |
| 9,024,744 B2 | 5/2015 | Klose et al. | |
| 9,445,270 B1 | 9/2016 | Bicket et al. | |
| 9,477,639 B2 | 10/2016 | Fischer et al. | |
| 10,033,706 B2 | 7/2018 | Bicket et al. | |
| 10,085,149 B2 | 9/2018 | Bicket et al. | |
| 10,102,495 B1 | 10/2018 | Zhang et al. | |
| 10,173,486 B1 | 1/2019 | Lee et al. | |
| 10,173,544 B2 | 1/2019 | Hendrix et al. | |
| 10,175,054 B2* | 1/2019 | Woodard | G06Q 10/047 |
| 10,196,071 B1 | 2/2019 | Rowson et al. | |
| 10,206,107 B2 | 2/2019 | Bicket et al. | |
| 10,390,227 B2 | 8/2019 | Bicket et al. | |
| 10,579,123 B2 | 3/2020 | Tuan et al. | |
| 10,609,114 B1 | 3/2020 | Bicket et al. | |
| 10,623,899 B2 | 4/2020 | Watkins et al. | |
| 10,824,145 B1* | 11/2020 | Konrardy | B60W 10/04 |
| 10,827,324 B1 | 11/2020 | Hajimiri et al. | |
| 10,843,659 B1 | 11/2020 | Innocenzi et al. | |

(Continued)

*Primary Examiner* — Bryan Bui
(74) *Attorney, Agent, or Firm* — Knobbe, Martens, Olson & Bear LLP

(57) ABSTRACT

An improved system and method of determining presence of stop signs at intersection based on multiple types of data including ground truth data, telemetry data, and/or trip stills gathered from vehicle devices. The data may be analyzed and aggregated by one or more models and/or neural networks to develop a prediction regarding presence of stop signs at individual intersections.

20 Claims, 4 Drawing Sheets

(56) References Cited

U.S. PATENT DOCUMENTS

| | | |
|---|---|---|
| 11,046,205 B1 | 6/2021 | Govan et al. |
| 11,122,488 B1 | 9/2021 | Lloyd et al. |
| 11,126,910 B1 | 9/2021 | Akhtar et al. |
| 11,128,130 B2 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 2002/0061758 A1 | 5/2002 | Zarlengo et al. |
| 2005/0286774 A1 | 12/2005 | Porikli |
| 2006/0167591 A1 | 7/2006 | McNally |
| 2008/0319602 A1 | 12/2008 | McClellan et al. |
| 2009/0240427 A1 | 9/2009 | Siereveld et al. |
| 2010/0049639 A1 | 2/2010 | Ferro et al. |
| 2011/0276265 A1 | 11/2011 | Husain |
| 2012/0201277 A1 | 8/2012 | Tanner et al. |
| 2012/0235625 A1 | 9/2012 | Takehara |
| 2012/0303397 A1 | 11/2012 | Prosser |
| 2013/0162421 A1 | 6/2013 | Inaguma et al. |
| 2013/0244210 A1 | 9/2013 | Nath et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0195106 A1 | 7/2014 | McQuade et al. |
| 2014/0278108 A1 | 9/2014 | Kerrigan et al. |
| 2014/0354227 A1 | 12/2014 | Tyagi et al. |
| 2014/0354228 A1 | 12/2014 | Williams et al. |
| 2015/0044641 A1 | 2/2015 | Chauncey et al. |
| 2015/0074091 A1 | 3/2015 | Walkin et al. |
| 2015/0226563 A1 | 8/2015 | Cox et al. |
| 2015/0283912 A1 | 10/2015 | Shimizu et al. |
| 2016/0275376 A1 | 9/2016 | Kant |
| 2016/0288744 A1 | 10/2016 | Rutherford et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0102463 A1 | 4/2017 | Hwang |
| 2017/0140603 A1 | 5/2017 | Ricci |
| 2017/0263049 A1 | 9/2017 | MacDonald et al. |
| 2017/0286838 A1 | 10/2017 | Cipriani et al. |
| 2017/0291611 A1 | 10/2017 | Innes et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0093672 A1 | 4/2018 | Terwilliger et al. |
| 2018/0262724 A1 | 9/2018 | Ross |
| 2019/0003848 A1 | 1/2019 | Hoten et al. |
| 2019/0118655 A1 | 4/2019 | Grimes et al. |
| 2019/0174158 A1 | 6/2019 | Herrick et al. |
| 2019/0244301 A1 | 8/2019 | Seth et al. |
| 2019/0286948 A1 | 9/2019 | Sathyanarayana et al. |
| 2019/0318419 A1 | 10/2019 | VanderZanden |
| 2019/0327590 A1 | 10/2019 | Kubo et al. |
| 2019/0327613 A1 | 10/2019 | Bicket et al. |
| 2020/0074397 A1 | 3/2020 | Burda et al. |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0293796 A1 | 9/2020 | Sajjadi Mohammadabadi et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0389415 A1 | 12/2020 | Zhao et al. |
| 2021/0006950 A1 | 1/2021 | Hajimiri et al. |
| 2021/0133218 A1 | 5/2021 | Bukowski |

\* cited by examiner

MODELS FOR STOP SIGN DATABASE CREATION

FIELD

Embodiments of the present disclosure relate to devices, systems, and methods that access data from multiple sources to automatically detect presence of stop signs at intersections.

BACKGROUND

Map data that accurately represents geographic features has become increasingly important as applications that make use of such map data have grown. For example, vehicle navigation applications, such as those that provide driver safety features and/or partially or fully automate driving, may rely on the map data for indications of passageways, intersections, stop lights, stop signs, speed limits, and the like. Use of outdated, incomplete, or incorrect map data may pose significant safety risk for such applications.

SUMMARY

The systems, methods, and devices described herein each have several aspects, no single one of which is solely responsible for its desirable attributes. Without limiting the scope of this disclosure, several non-limiting features will now be described briefly.

As described in further detail herein, a combination of algorithmic models and data sources may be used to develop and update map data to more accurately reflect locations of certain feature, such as signs (e.g., stop, yield, etc. signs) and stop lights within a geographic region. A combination logic may access ground truth mapping data (e.g., from municipalities), vehicle telemetry models (e.g., that analyze telemetry data from vehicle tracking devices, such as speed and distance from an intersection), and/or a trip stills models (e.g., that analysis photographs from forward facing cameras of vehicles to identify likely stop signs within the images) to predict whether a particular feature (e.g., a stop sign) is present at a particular intersection. The input data from the different sources may be weighted, combined, and used to generate one or more outputs, such as a prediction and/or confidence level, indicative of whether the feature is present at the intersection.

Further, as described herein, according to various embodiments systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, the present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, machine vision devices, and may enable a user to more quickly and accurately access, navigate, assess, and digest analyses, configurations, image data, and/or the like, than previous systems.

Various embodiments of the present disclosure provide improvements to various technologies and technological fields, and practical applications of various technological features and advancements. Additionally, various embodiments of the present disclosure are inextricably tied to, and provide practical applications of, computer technology. In particular, various embodiments rely on detection of user inputs via graphical user interfaces, operation and configuration of algorithmic models, calculation of updates to displayed electronic data based on user inputs, automatic processing of image data, and presentation of updates to displayed images and analyses via interactive graphical user interfaces. Such features and others are intimately tied to, and enabled by, computer and machine vision technology, and would not exist except for computer and machine vision technology.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
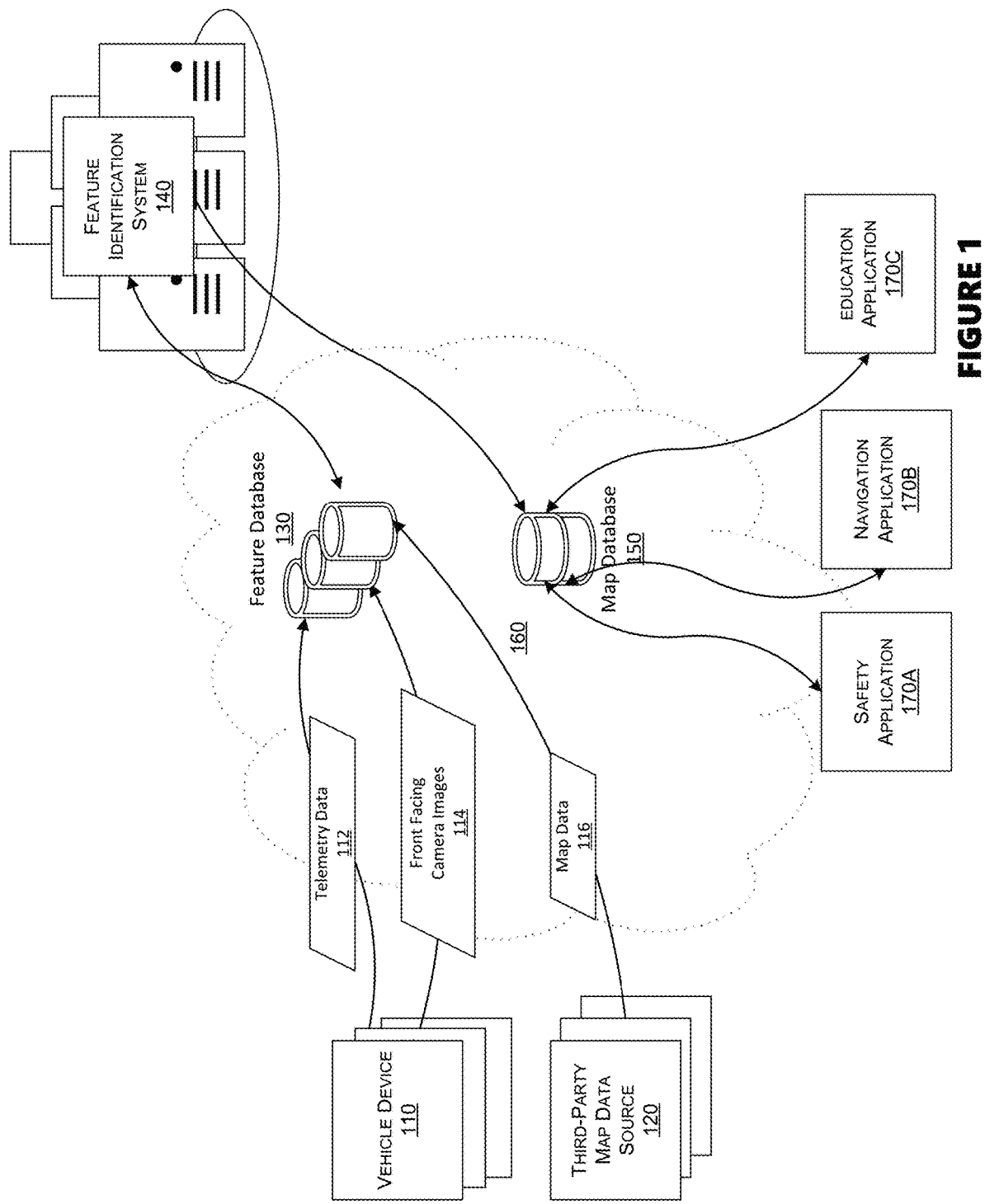
FIG. 1 is a block diagram illustrating an example feature identification system in communication with various other devices and databases.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Vehicle Device: an electronic device that includes one or more sensors positioned on or in a vehicle. A vehicle device may include sensors such as one or more video sensors, audio sensors, accelerometers, global positioning systems (GPS), and the like. Vehicle devices include communication circuitry configured to transmit data to a backend (or "cloud" server), for example.

Sensor Data: any data obtained by a vehicle device, such as video files, still images, audio data, accelerometer data, global positioning system (GPS) data, ECU data, vehicle speed data, forward camera object tracking data, driver facing camera data, hand tracking data and/or any other related data and/or other data files.

Telemetry Data: sensor data obtained from vehicle devices that is generally indicative of a characteristic of the device and/or the vehicle to which the device is attached. As used in certain examples herein, telemetry data generally refers to speed and location information (e.g., latitude and longitude coordinates) of a vehicle device (and vehicle), but telemetry data may include any other sensor data obtained from vehicle devices. For example, telemetry data may further include sensor outputs such bearing, direction, timestamp, vehicle ID, and the like, for each of thousands, millions, billions, or more telemetry data points.

Telemetry Data Point: a set of telemetry data associated with a particular location and time. A telemetry data point may include location information (e.g., Latitude and longitude, or other location information), vehicle speed, vehicle direction, timestamp, and/or other related information. A vehicle device may be configured to create a telemetry data point periodically, e.g., every x seconds, and/or in response to certain events.

Trip Stills Data: sensor data obtained from vehicle devices that generally includes one or more images obtained from a vehicle device. Trip Stills data may also include metadata associated with images, such as resolution, compression type, compression amount, timestamp, etc. In some embodiments, trip stills data may include results of image analysis that is performed by the vehicle device and/or another device, such as information indicating features identified in images.

Trip Stills Data Point: a set of trip stills data associated with a particular image, such as an image obtained from a forward facing camera of a vehicle device. A trip stills data point may include location information, one or more versions of a forward facing image (e.g., with varying cropping, filtering, and/or other processing applied), a timestamp, and/or other related information. A vehicle device may be configured to create a trip stills data point periodically, e.g., every x seconds, and/or in response to certain events.

Map Data: geodata that indicates features of a geographic region. Map data may be used by various models and processes discussed herein, such as to identify intersections within a geographic region. One example of map data is OpenStreetMap (OSM) data. While some embodiments discussed herein may refer to use of OSM data, and discussion of OSM data is provided for purposes of illustration, the systems and methods discussed herein may perform similar functions using any other map data. Thus, any mention of OSM should be interpreted to also include any other available map data.

Node ID: In OSM, intersections are defined as nodes that are shared by multiple ways and a node ID identifies the intersection.

Way ID: In OSM, road segments are represented as ways and the way ID indicates a particular street of an intersection, such as a street that a stop sign is on.

Direction: as used herein, direction is an attribute indicating a direction of travel that a stop sign will be stopping. Each way may have a defined bearing (e.g., a particular direction of travel). The direction identifies if the stop sign is facing the same way as the way or if its opposite. For example, the direction may indicate whether the stop sign is on the left side of the road or the right side of the road.

Way Bearing: The actual bearing of the way in degrees.

Way Bearing NSEW: The way bearing converted to a string of NSEW

Intersection: a geographic location where two or more roads intersect. For example, an intersection may indicate a location where two roads intersect and create a four-way stop intersection. Another intersection may indicate a location where two roads meet to create a one-way, two-way, or three-way stop. As used herein, an intersection may refer to all roads that intersect or to a particular direction (or multiple directions) of roads that intersect.

Ground Truth Value: an indicator of presence of a stop sign at an intersection obtained from an external data source, such as from map data provided by a city or municipality. The ground truth value may be a first value (e.g., one) to indicate presence of a stop sign or a second value (e.g., zero) to indicate no stop sign at that intersection. Another ground truth value (e.g., negative one) may be used to identify intersections where presence of a stop sign is not indicated in the available ground truth map data.

Telemetry Probability: an output from the telemetry model indicating a probability (or likelihood) that a stop sign is present at a particular intersection. For example, a telemetry probability may range from zero, indicating the lowest likelihood of a stop sign, to one, indicating the highest likelihood of a stop sign at that particular intersection. In some implementations, a telemetry probability is set to negative one, for example, to indicate no telemetry probability has been determined for the particular intersection.

Telemetry Prediction: an output from a telemetry model indicating a prediction of whether a stop sign is present at a particular intersection. For example, a telemetry prediction may be a positive indicator (e.g., a value of one) to indicate a stop sign, a negative indicator (e.g., a value of zero) to indicate no stop sign, or an unavailable indicator (e.g., a value of negative one) to indicate that a prediction is not provided by the telemetry model. In some implementations, the telemetry prediction is based on the telemetry probability.

Trip Stills Probability: an output from the trip stills model indicating a probability (or likelihood) that a stop sign is present at a particular intersection. For example, a trip stills probability may range from zero, indicating the lowest likelihood of a stop sign, to one, indicating the highest likelihood of a stop sign at that particular intersection. In some implementations, a trip stills probability is set to negative one, for example, to indicate no trip stills probability has been determined for the particular intersection.

Trip Stills Prediction: an output from a trip stills model indicating prediction of whether a stop sign is present at a particular intersection. For example, a trip stills prediction may be a positive indicator (e.g., a value of one) to indicate a stop sign, a negative indicator (e.g., a value of zero) to indicate no stop sign, or an unavailable indicator (e.g., a value of negative one) to indicate that a prediction is not provided by the trip stills model. In some implementations, the trip stills prediction is based on the telemetry probability.

Combined Prediction: a prediction regarding presence of a stop sign at a particular intersection, taking into account various information associated with the intersection, such as ground truth value, telemetry probability, telemetry prediction, trip stills probability, trip stills prediction, and/or other data. A combined prediction may be binary, e.g., either a positive stop sign indication, such as "1", or a negative stop sign indication, such as "0" and/or may include a confidence level of stop sign presence within a range of values, such as from zero to one. A combined prediction may be used to update map data that is used by one or more external applications.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example System Overview

FIG. 1 is a block diagram illustrating an example feature identification system 140 in communication with various other devices and databases. In this example, the feature identification system 140 (or simply "system 140") is configured to process data from the feature database 130 to identify stop signs within a target geographic region (e.g., a particular city, region, etc.). While certain example implementations discussed herein refer to detection of stop signs, the systems and methods are also usable to detect other features, such as stop lights, other signs, and the like.

In the example of FIG. 1, the feature database 130 stores various data that may be used by the system 140 in identifying features of a geographic area based, such as telemetry data 112 and front facing camera images 114 that originate from a plurality of vehicle devices 110, such as dashcams. The telemetry data may include sensor outputs such as speed, location (e.g., latitude and longitude coordinates), bearing, direction, timestamp, vehicle ID, and the like, for each of thousands, millions, billions, or more data points. For example, a vehicle device (e.g., a dash cam) may store telemetry data every second or fraction of a second.

The front facing camera images 114 (or trip stills data 114) may be obtained from a dash cam that obtains images forward of the vehicle, such as on a periodic basis (e.g., every x seconds) and/or responsive to certain events (e.g., in response to activation of brakes). The example feature database 130 may also include map data 116 from one or more trusted third-party map data sources 120, which may also be referred to herein as ground truth data. The map data 116 may include indications of stop signs at certain intersections, but may also be lacking stop sign indications at other intersections where stop signs are present. The map data 116 may also include indications of intersections within a geographic region, whether or not stop signs are present.

The feature identification system 140 executes one or more models, such as using neural networks and/or other machine learning techniques, to identify stop signs within a geographic region based on the telemetry data 112, front facing camera images 114, and/or map data 116 associated with that geographic region. For example, the system 140 may be configured to output, for a particular intersection identified in the map data 116, a combined prediction of stop sign presence at the particular intersection. The combined prediction may include a confidence level that a stop sign is present at that intersection, such as from zero (0) indicating the lowest likelihood of a stop sign to one (1) indicating the highest likelihood of a stop sign at that particular intersection. This stop sign confidence level may then be used to supplement one or more map databases 150, which may be accessed by various applications, such as safety applications 170A, navigation applications 170B, education applications 170 C, and/or any other applications that use map data.

In some embodiments, the feature identification system 140 initially runs a data pipeline to assign the various input data items, such as telemetry data points in the telemetry data 112, trip stills in the front facing camera images 114, and ground truth data in the map data 116, to intersections within the geographic region. The system may then generate bounding boxes for each intersection. In some embodiments, each intersection may be indexed, such as using the H3 hexagon tiling system from Uber. The telemetry data 112 and front facing camera images 114 may then be mapped into the same geographic region, such as by using the H3 indices, to match telemetry and trip stills data points with intersections. For example, data points that are matched to within a certain distance of an identified intersection may be considered associated with that intersection. For individual intersections, the telemetry model may then be executed on the telemetry data associated with the intersection, and a trip stills model may be executed based on analysis of trip stills associated with the intersection. An aggregation model may then be executed to apply weightings, filters, machine learning, and/or the like, to provide a combined prediction of a stop sign being at that intersection. Further detail regarding each of these processes is provided below.

The various example computing devices 110, 120, 130, 170, and others, can be any computing device such as a server, server farm, virtual computing device, desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that allows a user to access interactive user interfaces, view images, analyses, or aggregated data, and/or the like as described herein. In various embodiments, users may interact with various components of the example operating environment via various computing devices. Such interactions may be accomplished via interactive graphical user interfaces, however alternatively such interactions may be accomplished via command line, and/or other means.

As shown in the example of FIG. 1, communications between the various devices occurs via a network 160, which may include one or more wired and/or wireless networks, such as one or more local area networks, wide area network, wireless local area network, wireless wide area network, the Internet, or any combination thereof.

Example Feature Identification Process

Figure 2:
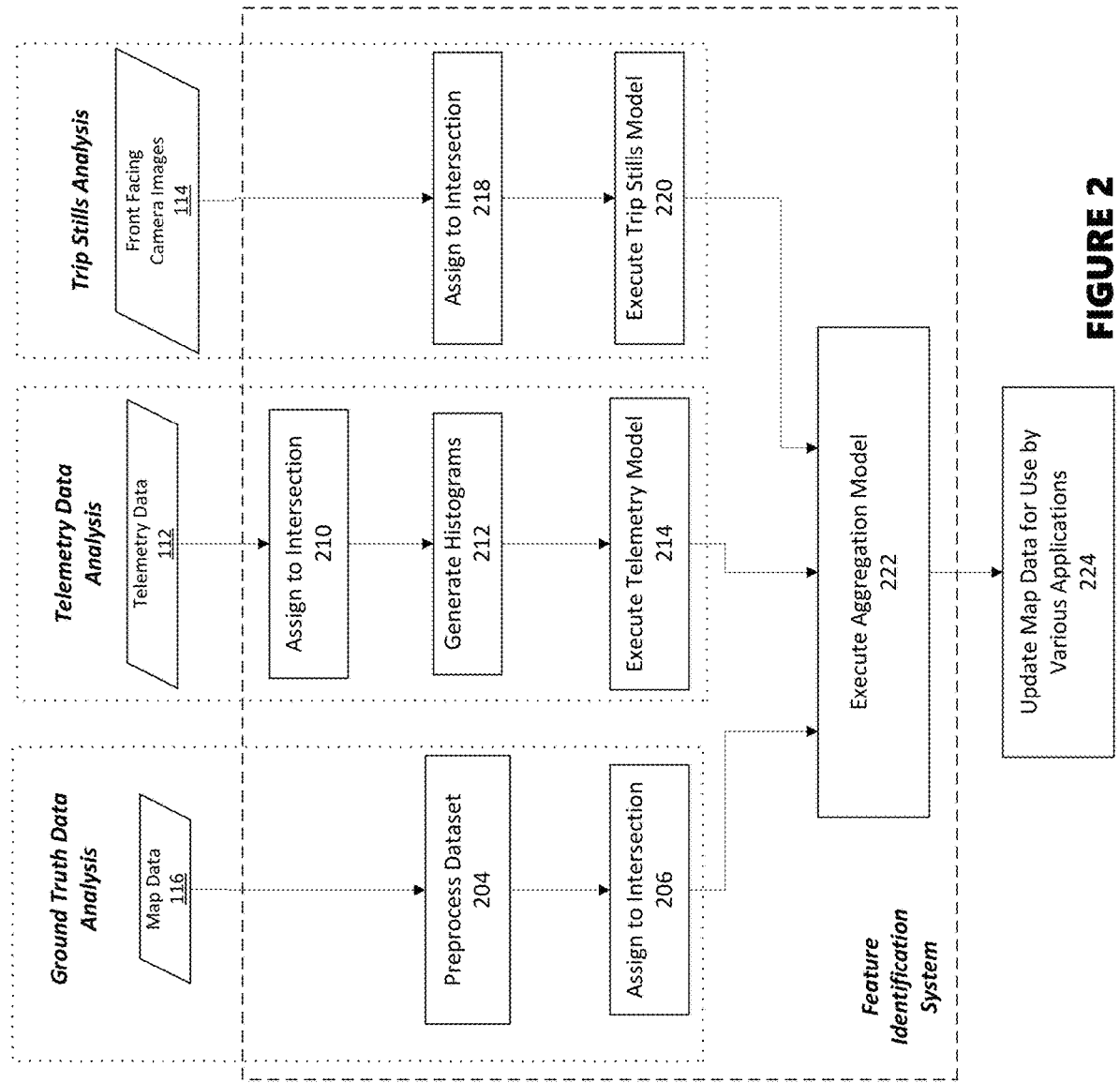
FIG. 2 is a flow diagram illustrating an example process by which a feature identification system receives and analyzes ground truth data, telemetry data, and dash cam images to identify stop signs at individual intersections in a geographic region.

FIG. 2 is a flow diagram illustrating an example process by which a feature identification system receives and analyzes ground truth data, telemetry data, and dash cam images to identify stop signs at individual intersections in a geographic region. In this example, the feature identification system may include a ground truth data analysis component that performs blocks 204, 206, a telemetry data analysis component that performs blocks 210, 212, 214, and a trip stills component that performs blocks 218, 220. The outputs of blocks 206, 214, 220 may be accessed by an aggregation model 222 that provides a combined prediction of stop signs at intersections, which may then be used to update map data for use by various applications 224.

In the embodiment of FIG. 2, the ground truth data analysis component accesses map data 116, such as from a government or private entity that has compiled map data. In some embodiments, the map data may be used as a starting point for identification of intersections for which a combined prediction will be ultimately be determined. In some embodiments, the map data 116 includes some stop sign indicators already. Thus, the system may extract stop sign indicators from the map data 116 and assign corresponding ground truth values to the corresponding intersections.

Beginning at block 204, the system processes map data to identify intersections within the map data. For example, the system may identify and classify nodes that are shared by more than one way as intersections. In some embodiments, map data includes a row for each node ID, with columns storing values for node latitude, node longitude, and the set of ways that make up the intersection. In some embodiments, an intersection table is generated to include a row for each combination of streets that meet at an intersection, e.g., one row for intersections with two streets and two rows for intersections with four streets. Intersection bounding boxes may then be associated with the geographic regions of the map for each combination of streets (e.g., for each row in intersection table). In some embodiments, the intersection bounding boxes are of a predefined size, such as an area corresponding to 57 m×47 m in the real world intersection region, while in other embodiments intersection bounding boxes may be custom sized based on automated analysis of the map data and/or input from one or more users. In some embodiments, intersection bounding boxes for intersections with odd numbers of streets may be sized and/or associated with the intersections in other manners, such as based on human input and/or further machine analysis.

At block 206, ground truth data included in the map data 116 (e.g., from one or more ground truth data sources) is associated with identified intersections and ground truth values are assigned to individual intersections. For example, if a stop sign is indicated in ground truth data for a particular intersection, the ground truth value may be set to one, while if a stop sign is not indicated in ground truth data for the particular intersection the ground truth value may be set to zero, and if ground truth data is not available for the particular intersection, the ground truth value may be set to negative one. In other embodiments, other representations of ground truth map data may be used.

As will be discussed further below, the ground truth data, a telemetry model, a trip stills model, and an aggregation model may be used to develop further indicators regarding presence (or absence) of stop signs at intersections. In some embodiments, the intersections table may be updated to include columns indicating ground truth value, telemetry prediction, trip stills prediction, and/or combined prediction regarding presence of a stop sign at the corresponding intersection.

Some non-limiting examples of machine learning algorithms that can be used to generate and update the various models discussed herein can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms. These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of received data may be analyzed to generate models without manual analysis or review by one or more people.

Example Telemetry Data Analysis

In some implementations, analysis of telemetry data for detection of stop signs may be very good at identifying true negatives (e.g., intersections without a stop sign are identified accurately as not having a stop sign), but somewhat prone to also identifying false positives (e.g., intersections without a stop sign may be mistakenly identified as having a stop sign). As noted further below, combination of the telemetry model output with the trip stills model output may compensate for deficiencies in the individual models and optimize accuracy of both positive and negative identifications of stop signs.

In the example of FIG. 2, telemetry data analysis begins at block 210, where telemetry data 112 is associated with particular intersections within map data. For example, telemetry data points may be analyzed to determine a bearing (e.g., an angle from starting point) and/or heading (e.g., direction relative to North), along with location information, that is used to determine whether the telemetry data point is within an intersection bounding box. In some embodiments, various criteria are applied to the telemetry data points to determine associations with intersection bounding boxes. For example, in some implementations a telemetry data point may only be associated with an intersection bounding box if a bearing associated with the telemetry data point is within a predetermined angle of a stop sign bearing, e.g., +/−60 degrees. In some embodiments, a distance of a telemetry data point from a corner of an intersection bounding box may be calculated, and telemetry data points within a predetermined distance from the corner may be used in a telemetry model to calculate a telemetry likelihood. In some embodiments, telemetry data points are associated with a particular direction of a particular intersection, such that telemetry data points for a North/South direction of travel may be used to separately calculate a telemetry prediction for a stop sign in the North/South direction of the intersection, while telemetry data points for an East/West direction of travel may be used to separately calculate a telemetry prediction for a stop sign in the East/West direction of the intersection. In some embodiments, telemetry data points for each individual direction of travel may be used to calculate a telemetry predictions for that particular direction of travel into the intersection.

Moving to block 212, telemetry data points for a particular intersection are used to generate a histogram, such as a kernel density estimate (KDE) plot, indicative of distance vs. vehicle speed associated with vehicle movements as the vehicle approached an intersection. A KDE plot may represent data using a continuous probability density curve in one or more dimensions. In some embodiments, other representations of telemetry data points may be used in place of, or in addition to, KDE plots. In some embodiments, a visualization (e.g., KDE plot) is generated only if a minimum quantity of data points (e.g., 100, 500, 1000, 5000, etc.) associated with an intersection are available.

Figure 4:
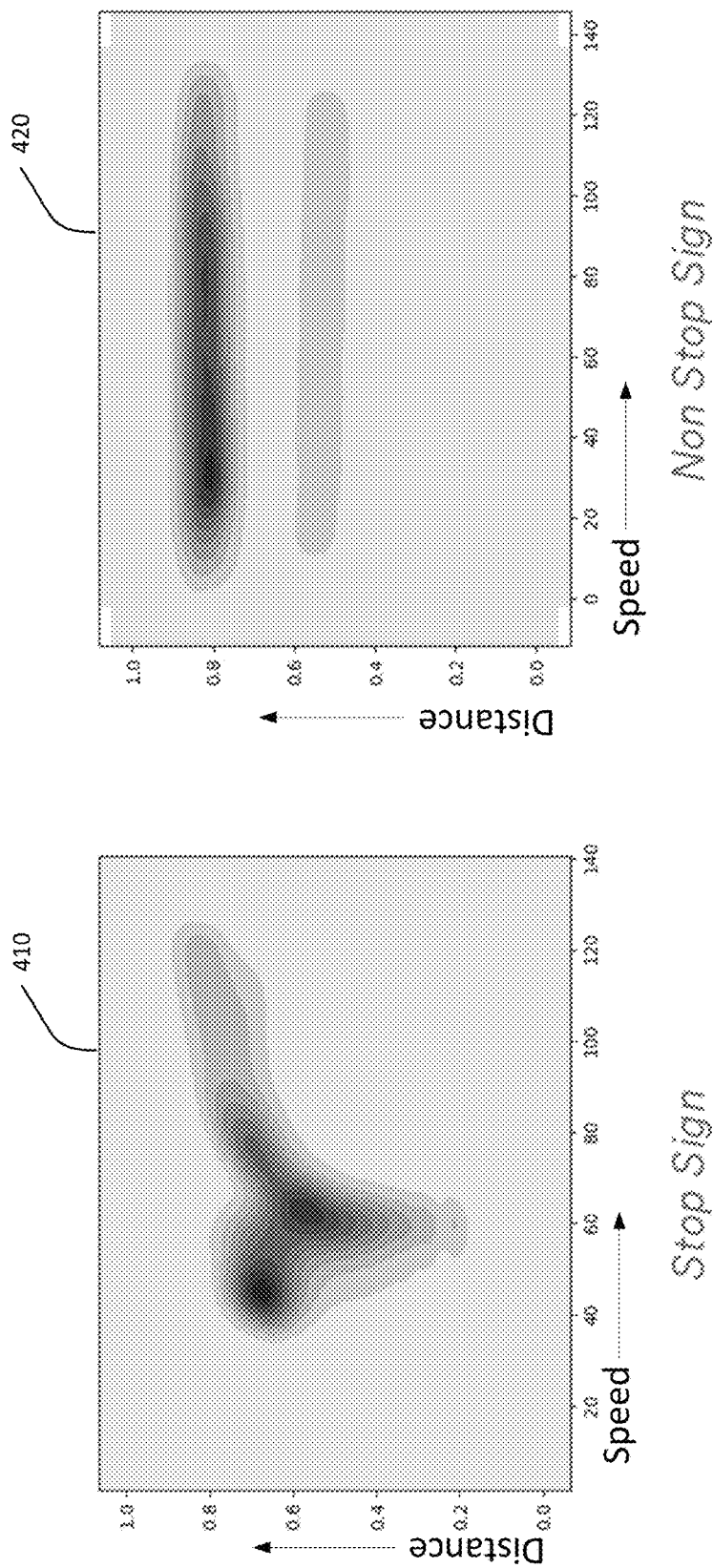
FIG. 4 illustrates two example KDE plots that may be used to detect presence of a stop sign based on comparison with telemetry data.

Moving to block 214, a telemetry model is evaluated based on the KDE plot for the intersection to determine a telemetry probability and/or telemetry prediction. In some embodiments, the telemetry model comprises one or more neural networks that are pre-trained based on training data that may include other KDE plots associated with intersections known to have a stop signs and/or KDE plots associated with intersections known to not have a stop signs. Thus, the telemetry model may output a telemetry probability generally indicating how similar a KDE plot for a particular intersection (or travel direction within an intersection) is to positive KDE plots associated with intersections known to have stop signs and/or how dissimilar the KDE plot for the particular intersection (or travel direction within an intersection) is to negative KDE plots associated with intersections known to not have a stop sign. For example, FIG. 4 illustrates two example KDE plots 410, 420. In this example, plot 410 is a KDE plot indicating speed versus distance for intersections known to have stop signs, while KDE plot 420 is a KDE plot indicating speed versus distance for intersections known to not have stop signs. Thus, comparisons of a KDE plot for a particular intersection to similar representative KDE plots may be used to predict whether the particular intersection has a stop sign present. In one example embodiment, the neural network may be a convolutional neural network, such as VGG19 that is executed on ImageNet with CrossEntropyLoss. In other embodiments, other neural networks and/or machine learning algorithms and techniques may be used.

In some embodiments, the telemetry prediction may be a binary prediction of whether a stop sign is present or not present at that intersection. For example, the telemetry prediction could be represented as either a yes or a no. In other embodiments, the telemetry prediction may be a first numerical value, e.g., "1" to represent a predicted stop sign, and another numerical value, e.g., "0" to represent prediction of no stop sign. In some embodiments, the telemetry prediction may have another value to indicate that a prediction was not made for the intersection, such as, e.g., "−1". The telemetry prediction may be based on a telemetry probability, which may indicate a confidence level that a stop sign is present at the particular intersection. For example, the telemetry probability may range from 0 to 1, wherein 0 indicates the lowest confidence level of a stop sign being present and 1 indicates the highest confidence level of a stop sign being present. For example, a telemetry probability of 0.95 may indicate that that telemetry model is 95% certain that a stop sign is present at a particular intersection. The telemetry prediction and/or telemetry probability may be provided to the aggregation model 222 to develop a combined prediction, which will be discussed further below.

Example Trip Stills Data Analysis

In some embodiments, analysis of trip stills data, e.g., forward facing images obtained from dash cams of vehicles for detection of stop signs may be less prone to false positives than analysis of telemetry data (discussed above), but more prone to not identify true positives. Thus, combination of the telemetry model output with the trip stills model output may compensate for deficiencies in the individual models and optimize accuracy of both positive and negative identifications of stop signs.

In the example of FIG. 2, trip stills analysis begins at block 218 where trip stills data 114 is associated with particular intersections within map data. Individual trip stills may be associated with particular intersections in various manners, certain of which are discussed further herein. In some embodiments, the latitude and longitude of each trip still is determined based on the associated trip stills data point. In some embodiments, the trip still may be associated with an intersection bounding box that is nearest (e.g., based on distance). However, assignment based on only distance may not accurately represent the most relevant intersection associated with the trip still, given that a vehicle can travel far in just a few seconds at a relatively low speed. Thus, in some implementations a more accurate estimation of the actual location of the trip still may be determined by calculating the latitude and longitude for the trip still based on the time difference and speed indicated in the trip stills data point. For example, the time difference between the trip still (e.g., the timestamp associated with the forward facing image) and the GPS data point (e.g., the timestamp associated with the GPS data) combined with the vehicle speed may provide an estimated distance the vehicle traveled. Additionally, the bearing of the GPS datapoint may be used, such as in combination with the distance traveled, to more accurately estimate the actual latitude and longitude of the trip still. In other implementations, other data points, algorithms, models may be used to more accurately identify associations between trip stills and intersections.

Moving to block 220, a trip stills model is evaluated based on any available trip stills associated with a particular intersection. In some embodiments, the trip stills model may only be executed if there is a sufficient number of trip stills that have been associated with the intersection (or specific direction(s) associated with the intersection). For individual trip stills images, a feature detection model may be used to analyze the image for presence of a stop sign. Depending on the embodiment, various feature detection models and training sets may be used in predict presence of stop signs within images. For example, in some embodiments, the R-FCN Resnet 101 model may be used to predict presence of stop signs in images. The feature identification model may output a trip stills probability for each processed trip still, such as ranging from zero to indicate the lowest likelihood of a stop sign in the image and 1 to indicate the highest likelihood of a stop sign in the image. In some embodiments, the feature detection model may also provide a stop sign bounding box indicating a specific area of the image in which a stop sign is detected, such as above a threshold probability.

With stop sign probabilities for individual trip stills generated, the trip stills model may determine an overall trip stills prediction for the intersection. For example, if a sufficiently high number of trip stills with probabilities above a minimum threshold are associated with a particular intersection, then a trip stills prediction may indicate presence of a stop sign at the intersection.

In some embodiments, a trip stills prediction may be a binary prediction of whether a stop sign is present or not present at a particular intersection. For example, the trip stills prediction could be represented as either a yes or a no, a zero or one, or the like. In some embodiments, the trip stills prediction may have another value to indicate that a prediction was not made for the intersection, such as a −1. A trip stills predication may further indicate a trip stills probability, which may indicate a confidence level that a stop sign is present at the particular intersection, such as may be based on trip stills probabilities for each of the trip stills associated with the intersection. For example, a trip stills probability and/or prediction for a particular intersection may be based on the quantity of trip stills identified as having a stop sign (e.g., having a trip stills prediction of 1), trip stills probabilities for the individual trip stills, and/or a location and size of the stop sign bounding box provided by the feature identification model. In other embodiments, other combinations of attributes may be used to predict presence (or absence) of a stop sign at a particular intersection. An output of the trip stills model may be provided to the aggregation model for generation of a combined prediction for the intersection. Depending on the embodiment, the trip stills output data may include various data, such as quantity of trip stills associated with the intersection, trip stills probabilities for each of the trip stills, location and size of the bounding boxes associated with any detected stop signs in the trip stills, and the like.

Example Aggregation Model

An aggregation model may be used to analyze various sources of stop sign presence data to make a combined prediction of whether a stop sign is located at an intersection (where intersection may be defined as a particular direction of travel within an intersection bounding box). Depending on the embodiment, the decision function used by the aggregation model may be biased towards precision over recall, because false positives may be much more disruptive to users of various applications that may rely on the stop sign information. However, the balance between precision and recall may be adjusted to provide different levels of coverage with correspondingly different levels of precision, such as based on the particular application of the output data. For example, if an application does not require high precision, the aggregation model may be optimized to provide a higher recall.

In some embodiments, the aggregation model includes one or more machine learning models trained on key statistical attributes of the telemetry and trip stills models (e.g., vehicles at intersections, confidence in prediction of each model, location of stop sign in trip still, etc.) to make a final inference. For example, the aggregation model 222 may output a stop sign indication (e.g., negative or positive) for individual intersections based on application of the machining learning model on outputs from the telemetry model 214 and trip stills model 220, which may each be machine learning models themselves in some embodiments. Thus, in some implementations, three machine learning models may be used to generate a stop sign inference for an intersection. In some embodiments, if a ground truth stop sign indication is available (e.g., from block 206), the aggregation model may not execute the machine learning model on the telemetry and trip stills model outputs, and instead use the ground truth indication as the stop sign indication.

Figure 3:
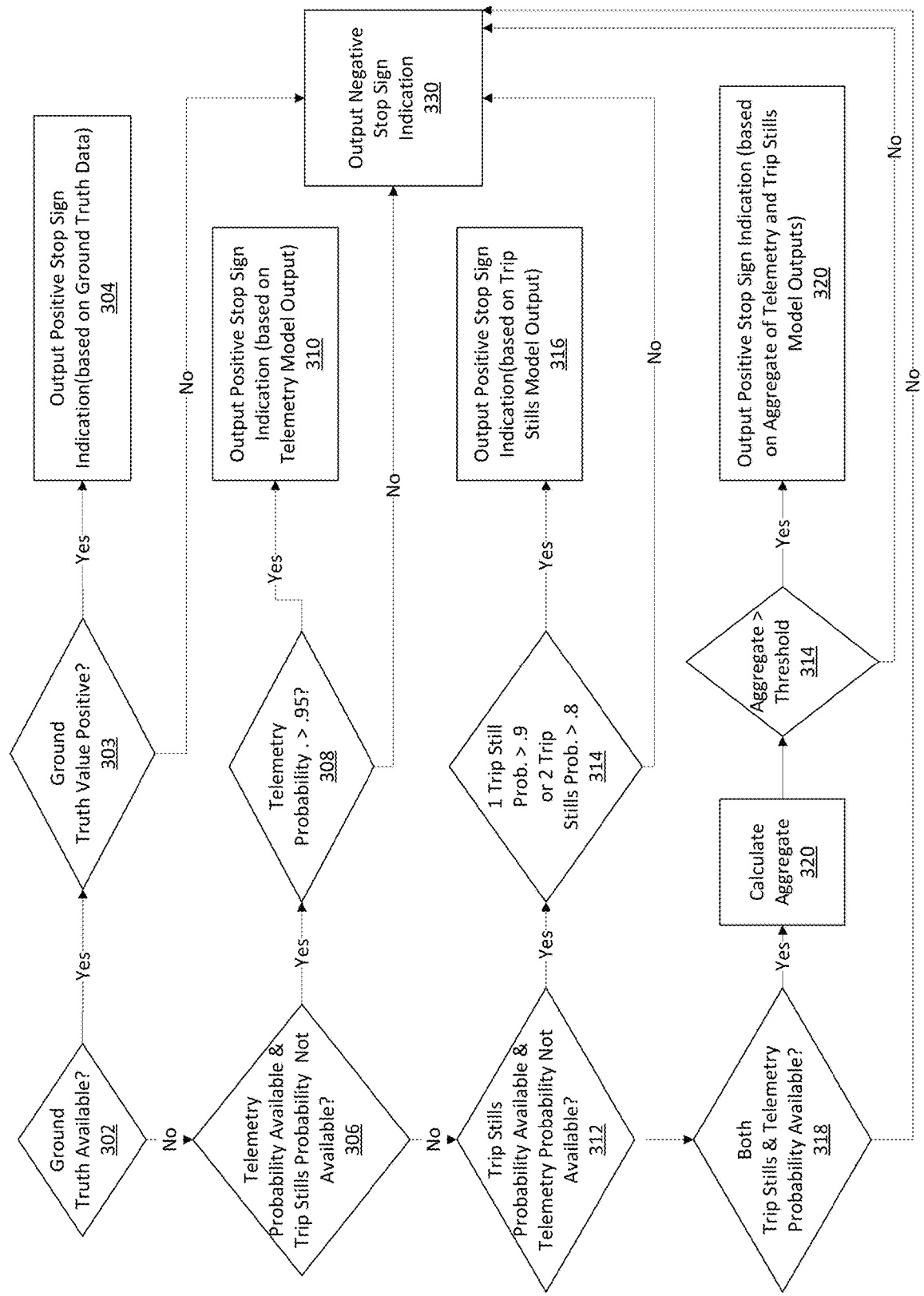
FIG. 3 is a flowchart illustrating one example of an aggregation model that may be used to evaluate various sources of information to provide a stop sign presence indicator usable by various map applications.

FIG. 3 is a flowchart illustrating another example of an aggregation model that may be used to evaluate various sources of information to provide a stop sign presence indicator usable by various map applications. In the example of FIG. 3, the aggregation model makes use of a heuristic to combine outputs from a telemetry model, a trip stills model, and ground truth data. Depending on the embodiment, the method of FIG. 3 may include fewer or additional blocks and the blocks may be performed in an order that is different than illustrated.

In the example of FIG. 3, beginning at block 302 the model determines whether a ground truth value is available for the intersection (e.g., where intersection may be defined as a particular direction of travel within an intersection bounding box). As discussed above, a ground truth value may be extracted or derived from data provided from a trusted third-party source, such as a municipality that has compiled map data including indications of stop signs at intersections. In this embodiment, if a ground truth value for the intersection is available, the method continues to block 303, where the ground truth value is evaluated. If the ground truth value is positive, e.g., the value is one or some other value indicating presence of a stop sign, the method continues to block 304 where a positive stop sign indication (e.g., a combined prediction for the intersection is set to one) is output from the aggregation model. Alternatively, if the ground truth value is negative, e.g., the value is zero or some other value indicating no stop sign is present, the method continues to block 330 where a negative stop sign indication (e.g., a combined prediction for the intersection is set to zero) is output from the aggregation model. If a ground truth value is not available, e.g., if the ground truth value is set to negative one to indicate unavailability and/or unreliability of ground truth data for the intersection, the method continues to block 306. In this example embodiment, the aggregation model does not consider the telemetry or trip stills data if a ground truth value for an intersection is available. However, in other embodiments, telemetry and/or trip stills data may be considered and, if analysis of the telemetry and/or trip stills data results in an output that is different than the ground truth value, further analysis of data associate with the intersection may be performed, e.g., manual review of the data may be requested to resolve the discrepancy.

If a ground truth value is not available at block 302, the method continues to block 306, wherein the telemetry probability is analyzed in the absence of a trip stills probability for the intersection. For example, a trip stills probability may be classified as not available if the trip stills probability for the intersection is set to negative one, or other value indicative that a trip stills probability for the intersection is not available. In this example embodiment, if the telemetry probability is greater than 95% at block 308, the method continues to block 310, where the aggregation model outputs a positive stop sign indication. Conversely, if the telemetry probability is less than 95% at block 308, the method continues to block 330 where the aggregation model outputs a negative stop sign indication. Depending on the embodiment, other telemetry probability levels may be used at block 308, such as 75%, 80%, 85%, 90%, 97%, 99%, etc.

If, at block 306, trip stills probabilities are not available, the method continues to block 312. At block 312, analysis of trip stills probabilities is performed at block 214 if trip stills probabilities are available and a telemetry probability is not available. In this embodiment, a positive stop sign indicator is output at block 316 if a single trip still probability (e.g., associated with a single forward facing image that has been determined to be associated with the particular intersection) exceeds 90% (or some other threshold value in other embodiments). Similarly, a positive stop sign indicator is output if two or more individual trip still probabilities each exceed 80% (or some other threshold value in other embodiments). Other combinations of probability thresholds for other quantities of images may be used in other embodiments. If, at block 314, none of the conditions are met, the method continues to block 330 where a negative stop sign indication is associated with the intersection.

If, at block 312, a telemetry probability is available, the method continues to block 318 where, if both trip stills and telemetry probabilities are available, an aggregate probability is calculated at block 324 to determine whether a positive or negative stop sign indicator should be output. In some embodiments, the aggregate is an average of an overall trip stills probability for the intersection and the telemetry probability. In some embodiments, the aggregate may be a weighted average of the trip stills and telemetry probabilities. In other embodiments, the trip stills and telemetry probabilities may be combined in other manners. At block 314, if the aggregate probability exceeds a threshold, the method continues to block 320 where a positive stop side indication is provided. Conversely, if the aggregate does not exceed the threshold, the method continues to block 330 where a negative stop sign indication is output.

In one embodiment, output from the various models identified in FIG. 2 and three may include some or all of: Node ID, Way ID, Direction, Latitude/Longitude, Way Bearing, Way Bearing NSEW, Ground Truth Value, Telemetry Prediction, Telemetry Probability, Trip Prediction, Trip Probability, and/or Combined Prediction.

Depending on the embodiment, the aggregation model may include one or more machine learning models that take inputs from one or more of the telemetry and trip stills models, and/or may include some heuristics, such as shown in the example of FIG. 3.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method performed by a computing system having one or more hardware computer processors and one or more non-transitory computer readable storage device storing software instructions executable by the computing system, the method comprising:
    accessing map data including indications of points of interest within a geographic region;
    accessing a plurality of trip stills data points each indicating at least a trip stills image obtained from a vehicle camera and an associated point of interest in the map data;
    accessing a plurality of telemetry data points each indicating at least a speed of a vehicle and an associated point of interest in the map data; and
    for individual points of interest:
        evaluating a neural network based on the telemetry data points associated with the individual point of interest to determine a telemetry probability for the individual point of interest;
        evaluating an object detection model for one or more trip stills data points associated with the individual point of interest to determine a corresponding one or more trip stills probabilities indicating likelihood of an object of interest in the trip stills image of the trip stills data point; and
        determining a likelihood of the object of interest being present at the individual point of interest based on at least the telemetry probability for the individual point of interest and the one or more trip stills probabilities associated with the point of interest.

2. The method of claim 1, wherein if both a telemetry probability and a predetermined quantity of trip stills probabilities are available for an individual point of interest, the likelihood of the object of interest being present at the individual point of interest is based on a combined prediction representative of aggregation of the telemetry probability and the trip stills probabilities.

3. The method of claim 2, wherein the combined prediction indicates presence of an object of interest if the telemetry probability is above a first threshold and less than a minimum quantity of trip stills probabilities for the point of interest are available.

4. The method of claim 3, wherein the first threshold is 95%.

5. The method of claim 3, wherein the likelihood of the object of interest being present at the individual point of interest indicates presence of an object of interest if at least one trip stills probability is above a second threshold.

6. The method of claim 5, wherein the second threshold is 90%.

7. The method of claim 6, wherein the likelihood of the object of interest being present at the individual point of interest indicates presence of an object of interest if at least two trip stills probabilities are above a third threshold.

8. The method of claim 7, wherein the third threshold is 80%.

9. The method of claim 1, further comprising, for each point of interest:
evaluating each of a plurality of trip stills probabilities associated with the individual point of interest; and
determining an overall trip stills probability for the individual point of interest based on the plurality of trip stills probabilities.

10. The method of claim 9, wherein the overall trip stills probability indicates a quantity of trip stills probabilities associated with the individual point of interest.

11. The method of claim 1, wherein a first individual point of interest indicates a first direction of travel associated with two intersecting streets.

12. The method of claim 11, wherein a second individual point of interest indicates a second direction of travel associated with the two intersecting streets.

13. The method of claim 1, wherein the objects of interest comprise stop signs.

14. The method of claim 1, wherein the points of interest comprise intersections.

15. A computing system comprising:
a hardware computer processor;
a non-transitory computer readable medium having software instructions stored thereon, the software instructions executable by the hardware computer processor to cause the computing system to perform operations comprising:
accessing map data including indications of points of interest within a geographic region;
accessing a plurality of trip stills data points each indicating at least a trip stills image obtained from a vehicle camera and an associated point of interest in the map data;
accessing a plurality of telemetry data points each indicating at least a speed of a vehicle and an associated point of interest in the map data; and
for individual points of interest:
evaluating a neural network based on the telemetry data points associated with the individual point of interest to determine a telemetry probability for the individual point of interest;
evaluating an object detection model for one or more trip stills data points associated with the individual point of interest to determine a corresponding one or more trip stills probabilities indicating likelihood of an object of interest in the trip stills image of the trip stills data point; and
determining a likelihood of the object of interest being present at the individual point of interest based on at least the telemetry probability for the individual point of interest and the one or more trip stills probabilities associated with the point of interest.

16. The computing system of claim 15, wherein if both a telemetry probability and a predetermined quantity of trip stills probabilities are available for an individual point of interest, the likelihood of the object of interest being present at the individual point of interest is based on a combined prediction representative of aggregation of the telemetry probability and the trip stills probabilities.

17. The computing system of claim 16, wherein the combined prediction indicates presence of an object of interest if the telemetry probability is above a first threshold and less than a minimum quantity of trip stills probabilities for the point of interest are available.

18. The computing system of claim 17, wherein the first threshold is 95%.

19. The computing system of claim 17, wherein the likelihood of the object of interest being present at the individual point of interest indicates presence of an object of interest if at least one trip stills probability is above a second threshold.

20. The computing system of claim 19, wherein the second threshold is 90%.

* * * * *